I. BENJAMINS.
RIM AND TIRE FOR AUTOMOBILE AND OTHER WHEELS.
APPLICATION FILED JUNE 2, 1921.
1,422,818.
Patented July 18, 1922.
3 SHEETS—SHEET 1.
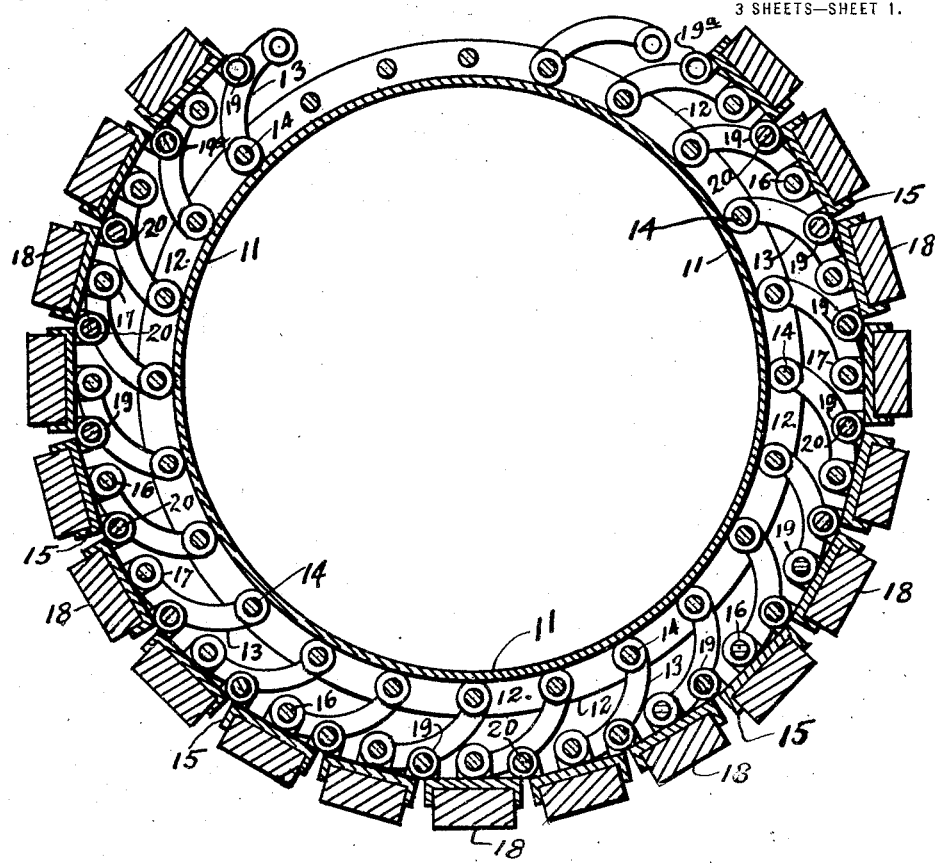
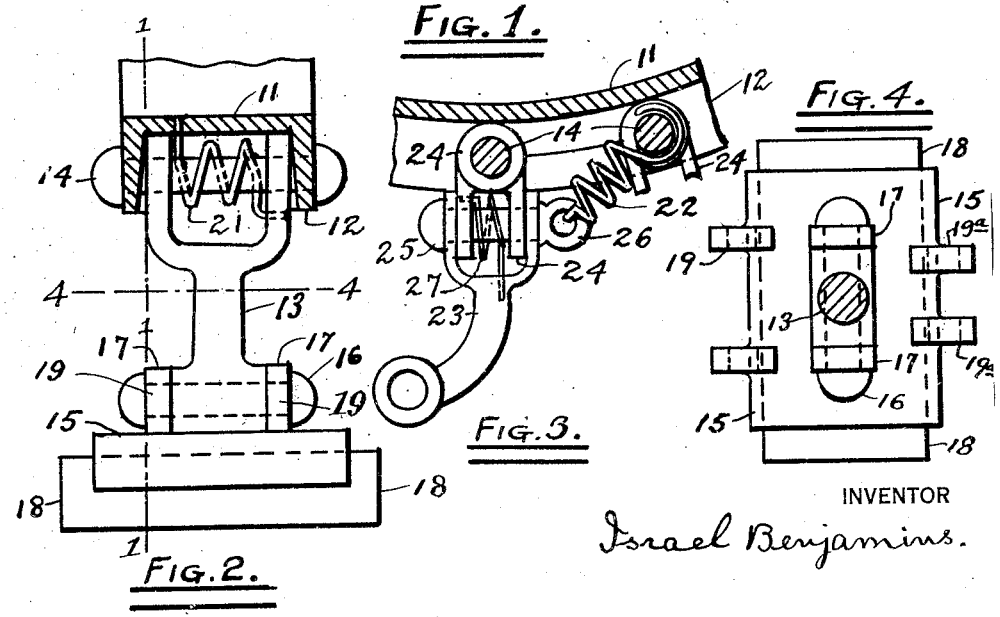
INVENTOR
Israel Benjamins.

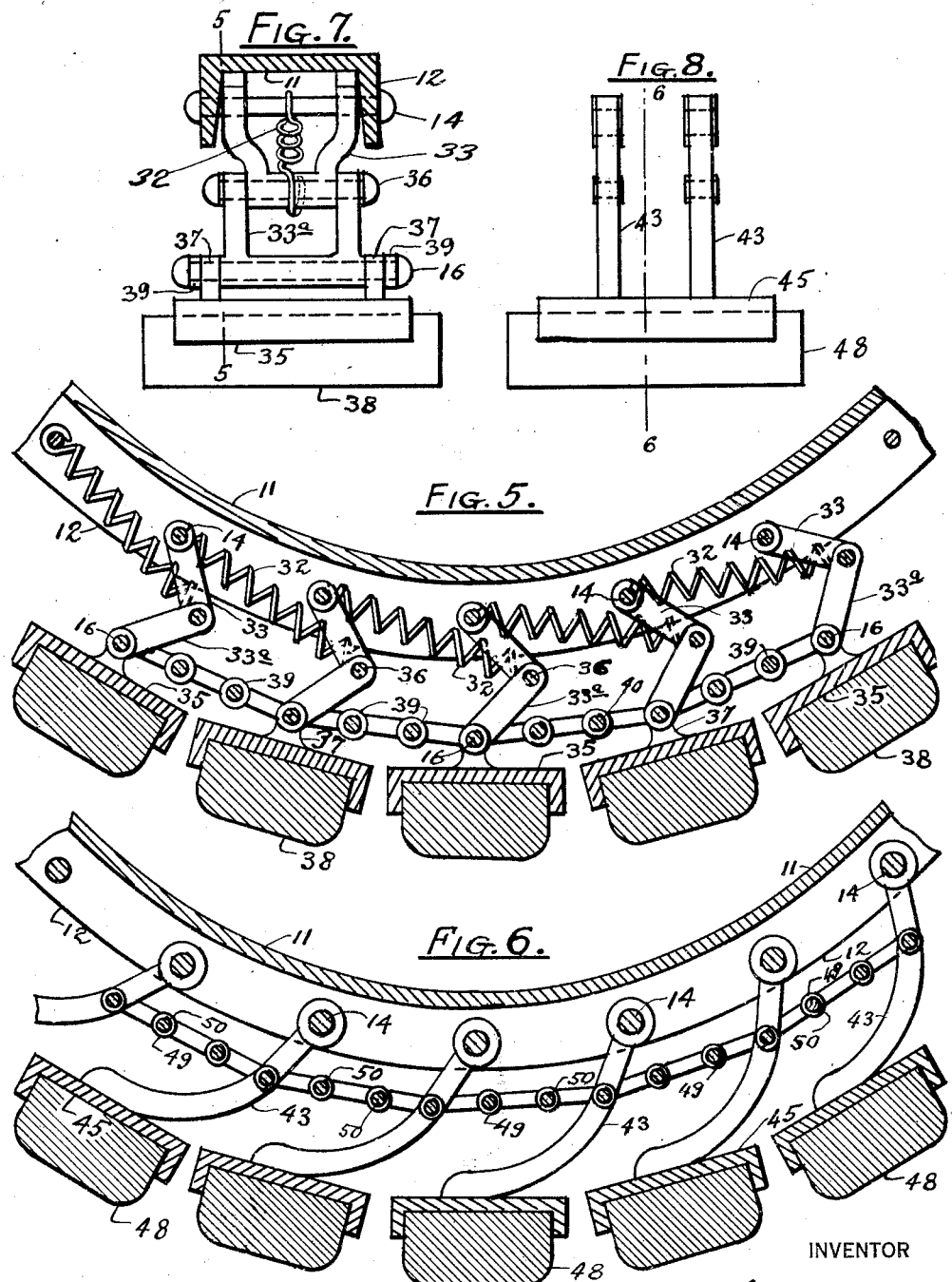

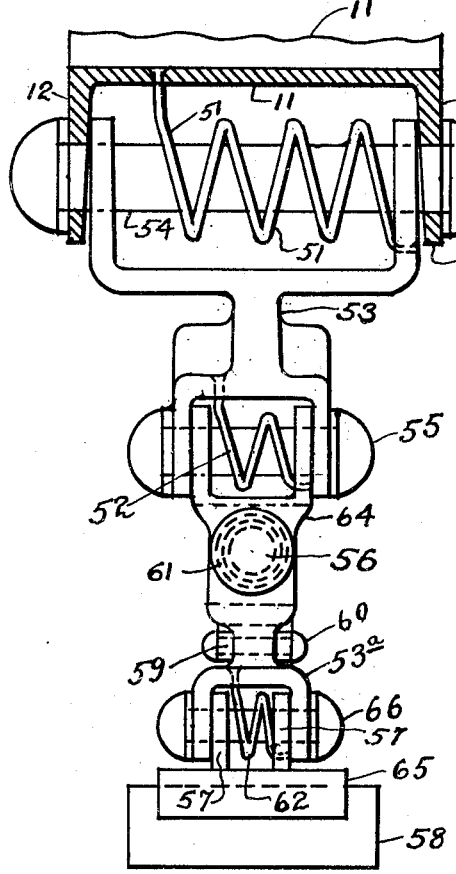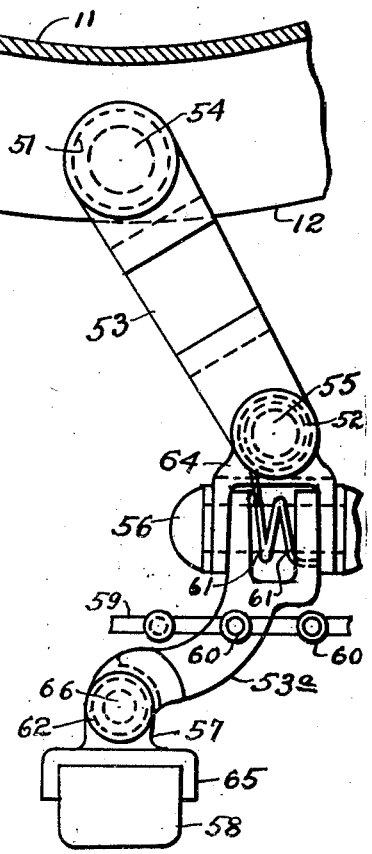

UNITED STATES PATENT OFFICE.

ISRAEL BENJAMINS, OF BROOKLYN, NEW YORK.

RIM AND TIRE FOR AUTOMOBILE AND OTHER WHEELS.

1,422,818. Specification of Letters Patent. Patented July 18, 1922.

Application filed June 2, 1921. Serial No. 474,566.

*To all whom it may concern:*

Be it known that I, ISRAEL BENJAMINS, a citizen of the United States, residing at Brooklyn, in the county of Kings and State of New York, have invented a new and useful Rim and Tire for Automobile and Other Wheels, of which the following is a specification.

My invention relates to improvements in rims and tires, which may be used for wheels of automobiles, trucks, motor cycles, bicycles and other vehicles, and it consists in the novel features hereinafter more fully described.

The objects of my improvement are:

First: To eliminate or reduce the amount of rubber employed for tires of automobiles and other wheels;

Second: To obviate the difficulties due to blow outs of pneumatic tires;

Third: To have a sensitive, spring-cushioned tire, with the springs out of contact with the road and fairly out of reach of mud and slush;

Fourth: To have the load distributed over a considerable area of the wearing surface and the strain due to the load and shocks taken up by more than one spring at a time.

Fifth: To provide cushioning also for the lateral shocks received by the wheel as well as for those in the plane of the wheel;

Sixth: To provide a readily replaceable wearing surface or surfaces for the tire;

Seventh: To have the rim with the tire demountable from the felly of the wheel;

Eighth: To have the wearing surfaces joined in an endless chain; and

Ninth: To have my rim and tire for automobile and other wheels simple, durable and inexpensive.

I attain these objects by the rim and tire illustrated in the accompanying drawings or by any mechanical equivalent or obvious modification of the same.

In the drawings Fig. 1 is a vertical section of one form of my rim and tire on the line 1—1 of Fig. 2, omitting part of the endless chain 15—15 and some of the levers 13 hereinafter described.

Fig. 2 is a detail showing a section in a radial plane of one form of my rim, showing one of the levers 13 with the other parts connected thereto in elevation.

Fig. 3 is a detail of another form of said lever, which is shown in elevation as connected to my rim, the view being in the plane of the wheel and the rim being shown in section.

Fig. 4 is mainly a plan of one of the chain of saddles 15 hereinafter described and is a section on the line 4—4 of Fig. 2.

Fig. 5 is a vertical section of another form of my rim and tire on the line 5—5 of Fig. 7, showing sundry details in elevation.

Fig. 6 is a vertical section of a modified form of my rim and tire on the line 6—6 of Fig. 8, also showing some details in elevation.

Fig. 7 is a detail of the form of my rim and tire shown in Fig. 5, and it shows a radial section of the rim and a view of the details connected thereto in end elevation.

Fig. 8 is a detail in end elevation of one of the levers, saddles, and wearing blocks in the form of my rim and tire shown in Fig. 6.

Figs. 9 and 10 are details of modifications of my rim and tire, which are hereinafter more fully described: Fig. 9 is a view looking from left to right in Fig. 10, and Fig. 10 is a view looking from right to left in Fig. 9.

Similar numerals refer to similar parts throughout the several views.

11 designates the rim of my rim and tire for automobile and other wheels, which rim may be preferably demountable; but it may also be made in one with or connected to the wheel; it may conveniently be made of a channel as shown in Figs. 2 and 7, or of any other rolled shape, if desired.

12 designates the flanges of said channel 11 or the equivalent part of any other rolled section that may be used.

13—13 are a number of levers, which are shown in Fig. 1 as pivotally connected at their inner ends to said flanges 12 by means of the pins 14.

Each of said levers 13 has pivotally connected thereto at its outer end the lugs 17 of one of the chain of saddles 15 by means of one of the pins 16; said saddles are shown as pivotally connected to each other at their ends by means of the lugs 19, 19ª and the pins 20, thereby forming an endless chain.

The saddles 15 may also be connected to each other by means of links or short chains as shown in Figs. 5 and 6.

Each of said saddles 15 is shown as holding a wearing block 18, which may be of wood, rubber or any other suitable material;

said block 18 may be wedged between the flanges at the end of each of said saddles 15, which flanges are shown as extending outwardly and at right angles to the main body or plate of each of said saddles.

Any other means of connecting said blocks 18 to said saddles 15 may be employed.

Each of said levers 13 may be forced outwardly by means of the torsional spring 21, which is shown in Fig. 2 as connected at one end thereof to the rim 11 and at the other end to said lever 13; the springs 21 may be initially strained to any required degree of intensity.

Any other form of spring may also be employed, if desired, such as the tensile spring 22, shown in Fig. 3, which shows the lever 23 as connected to the flanges of the rim 11 by means of the universal joint 24, which is shown as pivotally connected to said flanges 12 by means of the pin 14 and to said lever 23 by means of the pin 25, which has at one end thereof the eye 26, to which said spring 22 may be hooked on at one end thereof; at the other end it may be hooked on to the adjacent pin 14 of the adjacent lever 23 of the series of limbs connected to the rim 11, as shown in Fig. 3.

The lever 23 may be displaced sideways at right angles to the plane of the wheel by any obstacle in its path and returned to its original position in the plane of the wheel by means of the torsional spring 27, which is shown in Fig. 3 as having one end thereof connected to the universal joint 24 and the other end to said lever 23.

The tensile spring 22 may also be connected to the limb 23 at any other point than as shown in Fig. 3, and other means may be employed to replace the lever 23, when displaced, to its original position in the plane of the wheel.

In the form of my rim and tire, shown in Figs. 5 and 7, the saddles 35 are connected to the flanges 12 by means of the toggle joint 33—33ª and the pins 14, 16 and 36.

The tensile springs 32 are shown in Fig. 5 as tending to straighten the toggle joints thereby pressing the saddles 35 outwardly.

The saddles 35 are shown as connected to each other by means of the chain 39—40, pivotally joined at the lugs 37.

Any other form of chain may be used for connecting the lugs 37.

Instead of the tensile spring 32 in the form of my rim and tire shown in Fig. 5 torsional springs may be used at the joints 14 and 36, similar to the springs 51, 52, 61 and 62 in Figs. 9 and 10 respectively, for straightening the toggle joints 33—33ª.

In the form of my rim and tire shown in Figs. 6 and 8 the levers 43 may be made in one with the saddles 45, or they may be rigidly secured thereto.

In Figs. 9 and 10 the saddles 65, which hold the wearing members 58 are connected to the flanges 12 by means of the levers 53 and 53ª, the universal joint 64 and the pins 54, 55, 56 and 66.

The torsional springs 51, 52, 61 and 62 tend to straighten the toggle joint formed by the levers 53 and 53ª, with the saddle 65, shown in Figs. 9 and 10, into a radial position, thereby pressing the saddles 65 outwardly.

The saddles 65 are shown as adapted to be connected to each other by means of the chains 59—60, which are connected to the levers 53ª.

Either the levers 43 or the saddles 45 may be connected by the chain 49—50, and springs, similar to 21 or 27 may be employed with the levers 43.

The wearing blocks 48 may be made preferably of rubber or some other yielding material.

The chain of saddles and wearing blocks may be replaced by any other connecting and wearing means, to which the levers 13 or 23 of Figs. 1, 2 and 3 or the toggle joints 33—33ª of Figs. 5 and 7 may be connected.

A universal joint, as above described, may be employed with all forms of my rim and tire as shown in Figs. 9 and 10.

Many other changes could be made in the design of my rim and tire for automobile and other wheels without departing from the main scope of my invention.

I do not, therefore, restrict myself to the details as shown in the drawings; but I intend to include also all mechanical equivalents and reasonably obvious modifications of the same within the scope of my invention.

What I claim as my invention, and desire to secure by Letters Patent is:

1. In a rim and tire for automobile and other wheels a series of wearing blocks, saddles adapted to hold said blocks, said saddles being connected to each other to form an endless chain, a rim, a series of levers pivotally connected at their outer ends to said saddles and at their inner ends to said rim and springs adapted to act on said levers, thereby acting on said saddles and wearing blocks.

2. In a rim and tire for automobile and other wheels a series of wearing blocks, a rim, levers pivotally connected to said rim at their inner ends and joined to said blocks at their outer ends, combined with springs adapted to act on said levers, thereby acting on said blocks.

3. In a rim and tire for automobile and other wheels a series of wearing blocks, a rim, levers pivotally connected to said rim and joined to said blocks, combined with torsional springs adapted to act on said levers, thereby acting on said blocks.

4. In a rim and tire for automobile and other wheels a series of wearing blocks, a rim, levers connected to said rim by means of universal joints and joined to said blocks, combined with springs adapted to act on said levers thereby acting on said blocks.

5. In a rim and tire for automobile and other wheels a series of wearing blocks, a rim, levers connected to said rim by means of universal joints and joined to said blocks, a set of springs, connected to said rim and adapted to press on said blocks through said levers outwardly in the plane of the wheel, and another set of springs, connected to said universal joints and adapted to replace said blocks into the plane of the wheel when said blocks are displaced therefrom by any obstacle.

6. In a rim and tire for automobile and other wheels a series of wearing blocks, a rim, pairs of levers forming toggle joints, pivotally connected to said rim and joined to said blocks, combined with springs adapted to act on said levers, thereby acting on said blocks.

7. In a rim and tire for automobile and other wheels a series of wearing blocks, a rim, levers pivotally connected to said rim and joined to said blocks, an endless chain flexibly connecting said levers, each in a position inclined to said rim, and springs adapted to act on said levers, thereby acting on said chain and blocks.

8. In a rim and tire for automobile and other wheels a series of wearing blocks, a demountable rim, levers pivotally connected to said rim and joined to said blocks, combined with springs adapted to act on said levers, thereby acting on said blocks.

9. In a rim and tire for automobile and other wheels a wearing member, a rim, a lever pivotally connected to said rim and joined to said member, combined with a spring adapted to act on said lever, thereby acting on said member.

10. In a rim and tire for automobile and other wheels a series of wearing blocks, a rim, levers pivotally connected to said rim at their inner ends and joined to said blocks at their outer ends, combined with a means for returning said levers to their original position in the plane of the wheel, after their being displaced therefrom.

11. In a rim and tire for automobile and other wheels a rim, levers pivotally connected thereto at their inner ends, a means for connecting their outer ends and springs adapted to act on said levers.

12. In a rim and tire for automobile and other wheels a demountable rim, spring-actuated members connected thereto at their inner ends and a means for connecting their outer ends.

Signed this 28th day of May, 1921.

ISRAEL BENJAMINS.